2,709,160

AMINE-COATED CALCIUM CARBONATE PIGMENTS

Alfred Korejwa, Talmadge, Ohio, and Lawrence J. Reader, Malvern, Pa., assignors to Wyandotte Chemicals Corporation, Wyandotte, Mich., a corporation of Michigan No Drawing. Application June 24, 1953,
Serial No. 363,916

12 Claims. (Cl. 260—27)

This invention relates to novel amine-coated calcium carbonate pigments which have improved properties as rubber reinforcing pigments. More specifically, the invention relates to calcium carbonate pigments whose surfaces are coated with an amine selected from the group consisting of 10–18 carbon atom primary n-alkylamines and rosin amines.

Calcium carbonate, particularly when in a finely divided state of the order of 0.1 micron or less has many desirable properties which make it valuable as a reinforcing pigment in both natural and synthetic rubbers. In particular, the fine particle size calcium carbonate reinforces the rubber in which it is incorporated and gives rise to high tensile strengths in the resultant rubber stocks. Because calcium carbonate is pure white in color, it is possible to prepare high tensile strength light colored rubber stocks, which is not possible with many reinforcing pigments such as carbon black. Yet another valuable property of calcium carbonate is that it develops good building tack in GR–S formulations.

In spite of the many desirable properties of calcium carbonate, it has certain serious shortcomings which limit its acceptance by the rubber industry. The ultra fine particle size calcium carbonates form hard agglomerates which are extremely difficult to incorporate and disperse in the rubber matrix. When such a fine particle size calcium carbonate is incorporated into rubber on a two-roll differential speed rubber mill, the calcium carbonate pigment forms a hard cake on the back roll which must be loosened by scraping and the resulting agglomerated particles disperse poorly in the rubber. The aforementioned difficulties can be partially overcome by master batching techniques, but these require longer processing cycles and limit the acceptance of calcium carbonate in the rubber industry. A further shortcoming of calcium carbonate is that its modulus values are lower than desired in many applications.

It is an object of this invention to provide a calcium carbonate pigment having improved processing characteristics and one which is more easily and uniformly dispersed in natural and synthetic rubbers.

A further object of this invention is to provide a calcium carbonate pigment that will provide improved physical properties in the rubber compositions in which it is incorporated.

Other objects and advantages of this invention will become apparent from the following detailed description thereof.

It has been discovered that a calcium carbonate pigment of excellent quality can be prepared by coating the surface of a finely divided calcium carbonate with an amine selected from the group consisting of 10–18 carbon primary n-alkylamines and rosin amines (hereinafter referred to simply as a "higher amine" for the sake of brevity). These novel amine-coated calcium carbonate pigments have excellent processing characteristics and are easily incorporated into rubber stocks without the difficulties that are usually associated with such fine particle size calcium carbonate pigments. In addition to improved processing characteristics, the amine-coated calcium carbonate pigments impart improved physical properties to the rubber stocks in which they are incorporated.

The chemical structure and nature of the 10–18 carbon atom primary n-alkylamines are well known and need not be set forth in detail. Such amines are normally derived from fatty alcohols by reaction with ammonia. Although all of the 10–18 carbon atom primary n-alkylamines give excellent results, the 16–18 carbon atom amines give rise to especially outstanding properties in the coated calcium carbonate and such pigments are a preferred embodiment of the invention. The rosin amines, as their name implies, are derived from wood and gum rosins. Chemically the rosins are 20 carbon atom organic acids, principally of the abietic and primaric acid type. The rosin amines are prepared by first converting the rosin acid to its nitrile (by reaction with ammonia) and by hydrogenating the rosin nitrile to form the corresponding amine. A thorough discussion of the many possible sources of rosin amines and methods of preparing same is contained in U. S. Patent 2,491,913, and that description is incorporated herein by reference. Any such rosin amine is operable in the present invention.

The higher amine is normally incorporated on the surface of the calcium carbonate pigment in an amount that ranges from approximately 0.2% to about 5% (calculated upon the weight of calcium carbonate), although smaller or larger quantities may be employed if desired. While quantities of higher amine of less than about 0.2% may be employed, the maximum improvement in properties is not obtained. Similarly, quantities of higher amine in excess of 5% may be employed and may further improve the processing characteristics of the pigment, but such improved processing is associated with a concomitant increase in "scorchiness" of the rubber stock. "Scorchiness" is the tendency of an elastomer to prevulcanize at relatively low processing temperatures and is generally considered to be an undesirable property in a rubber stock. The preferred products of the present invention contain 0.2–1.0% higher amine content.

The novel amine-coated calcium carbonate pigments can be prepared in many different ways. For example, the higher amine may be blended with a calcium carbonate pigment and the resulting mixture ball milled or hammer milled. However, since the improved properties of the amine-coated pigments are largely dependent, at least in theory, upon obtaining a uniform coating of the pigment, it is preferred to surface coat the calcium carbonate in an aqueous slurry that contains an emulsion, a dispersion or a solution of the higher amine. When the calcium carbonate pigment is prepared by a precipitation reaction, e. g. by the reaction of calcium chloride and sodium carbonate solutions, the pigment can be surface coated in situ by addition of the higher amine to one of the reacting solutions, or by addition to the reaction vessel immediately after precipitation. Alternatively, the calcium carbonate can be surface coated by addition of the higher amine to a repulped slurry of a previously dried and untreated precipitated calcium carbonate pigment. The addition of the higher amine to such aqueous systems may be made in the form of the amine as such, in the form of one of its water-soluble acid salts, or as an emulsion.

In addition to the foregoing improved and unusual achievements of our invention, the following beneficial advantages are obtained with the amine-coated calcium carbonate product:

1. Increased settling and filtration rates from aqueous vehicles.
2. Better color, higher gloss and less loginess in cured rubber stocks.
3. Less reduction in tensile strength and tear resistance properties, as compared to uncoated calcium carbonate pigments, with increased volume loading in natural rubber stocks.
4. Increased acceleration of vulcanization of rubber (the novel amine-treated calcium carbonate pigment of our invention is operable as a rubber vulcanization accelerator in and of itself).
5. Reduction in the amount of larger agglomerated particles (screened residue) in the dried and milled calcium carbonate pigment.
6. Decrease in the viscosity of an aqueous slurry or suspension of the amine-coated calcium carbonate pigment of a given solids content; thus permitting the use of relatively higher solids content slurries in pumping and material handling, such as required in paper and paint manufacturing processes.
7. Increased ease of re-dispersibility (a resuspension) of the settled calcium carbonate solids in an aqueous vehicle, after settling.

The following examples are set forth in detail to illustrate the principle and practice of this invention to those skilled in the art.

EXAMPLE 1

An aqueous suspension (32% solids content) of precipitated calcium carbonate in the form of a filter cake was taken from the filter wheel of a commercial process plant [Wyandotte Chemicals Corporation Calcium Carbonate Plant, production run No. T20H3, wherein the principal reacting materials were solutions of calcium chloride (distiller blow-off liquor from the ammonia stills of the ammonia-soda process) and a solution of sodium carbonate (decomposer outlet liquor from the crude sodium bicarbonate decomposer towers of the ammonia-soda process)]. To aliquot portions of 3000 grams each of this calcium carbonate suspension, there was then added varying quantities of a water-soluble, primary higher alkylamine acid salt prepared in the following manner: To 100 parts by weight of a primary amine derived from stearic acid (commercially available under the trade name "Armeen SD" manufactured by Armour & Co., of Chicago, Illinois) there was added 22 parts of glacial acetic acid. This primary amine was a mixture of 16 to 18 carbon atoms containing normal primary amines, present in approximately the following proportions:

| | Per cent |
|---|---|
| Hexadecyl n-primary amine | 10 |
| Octadecyl n-primary amine | 10 |
| Octadecenyl n-primary amine | 35 |
| Octadecadienyl n-primary amine | 45 |

The resultant n-primary alkyl amine acetate was then made into a 19% by weight water solution. This solution was then added to the 3000 gram portion of calcium carbonate slurry, in amounts of 1%, 2%, 3%, 4% and 5% by weight of alkylamine acetate (equivalent to 0.82%, 1.64%, 2.46%, 3.28% and 4.1%, respectively, of alkylamine) on the basis of $CaCO_3$ present, and sufficient water was added to adjust the slurries to an approximately 25% standard $CaCO_3$ content.

The so-prepared slurries were then filtered through a Buchner funnel with two No. 30 filter papers and under a 20–24 inch vacuum. The filtering rates of the various samples, in ml. of filtrate per minute collected over a 5 minute filtering period, were tabulated as follows:

Table I

| Percent by weight of n-primary alkyl amine acetate ($CaCO_3$ basis) | Filter Rate (cc. per min.) |
|---|---|
| 0.0 | 32 |
| 1.0 | 32 |
| 2.0 | 128 |
| 3.0 | 180 |
| 4.0 | 254 |
| 5.0 | 100 |

EXAMPLE 2

The novel results of our invention are especially applicable to a commercial process for the manufacture of precipitated $CaCO_3$, such as one involving the reaction of by product $CaCl_2$ and $Na_2CO_3$ solutions from the ammonia-soda process. Such a procedure is illustrated as follows:

By-product liquor from a commercial ammonia-soda process plant and consisting of approximately 110–120 g. p. l. of $CaCl_2$ solution (distiller blow-off liquor from the ammonia-soda process) was reacted with a solution of approximately 160–190 g. p. l. concentration of $Na_2CO_3$ and 50–70 g. p. l. concentration of $NaHCO_3$ (decomposer outlet liquor from the ammonia-soda process). As a factor in controlling the particle size of the precipitated $CaCO_3$, caustic soda was added to the distiller blow-off liquor in a sufficient quantity to neutralize the $NaHCO_3$ content of the distiller outlet liquor, plus an amount equivalent to 6% by weight based on the weight of $CaCO_3$ to be produced.

Alkylamine hydrochloric acid salt (the amine being derived from tallow and consisting of 30% hexadecyl n-primary amine, 25% octadecyl n-primary amine and 45% octadecyl n-primary amine) was added to the calcium chloride solution or distiller blow-off liquor, in an amount of 2% by weight on the basis of equivalent $CaCO_3$ precipitate derivable therefrom. Allowing for the water present in the hydrochloric acid salt, this 2% amount of alkylamine hydrochloride more precisely calculates to be 1.68% anhydrous amine salt basis. This 1.68% anhydrous amine hydrochloride is equivalent to 1.5% of the alkylamine. The amount of caustic soda added to the $Na_2CO_3$—$NaHCO_3$ solution was varied as indicated in Table II. The precipitation reactions of the so-treated solutions were conducted in 4-liter beakers using motor driven stirrers, the distiller outlet liquor being added over a period of 2 minutes. The respective slurry samples were then evaluated for settling rate and the approximate time required for filtration and washing. The results were as follows:

Table II

| Percent $C_{16-18}$ Primary Alkyl Amine Chloride (anhydrous basis) | NaOH Addition (to neutralize $NaHCO_3$) | Excess NaOH Added (Percent by wt., $CaCO_3$ basis) | Settling Rate (Settled vol. in cc. of $CaCO_3$ layer in 15 min.) (15 g./g./l. slurry) | Filtration and Wash Time Required (min./100g.) |
|---|---|---|---|---|
| 0 | Yes | 6.0 | 960 | 36 |
| 1.68 | Yes | 0 | 295 | 48 |
| 1.68 | Yes | 6.0 | 445 | 30 |
| 1.68 | No | 0 | 85 | 10 |

The enhancement of the tensile and tear strength properties in compounded natural rubber in which the amine-coated calcium carbonate precipitate of our invention is incorporated as a pigment or filler, is supported and illustrated by the following example:

EXAMPLE 3

Calcium carbonate samples, which were prepared with the starting materials and procedure of Example 1 and in which the amount of alkylamine acetate was varied from 0–5%, were evaluated at 36-volume filler loading in natural rubber stock prepared on a laboratory rubber mill according to the following test formula:

| Ingredients: | Parts by weight |
|---|---|
| 1-x smoked sheet | 100.0 |
| 2,2' benzothiazyl disulfide ("Altax") | 1.0 |
| Tetramethyl thiuram monosulfide ("Thionex") | 0.05 |
| Sulfur | 3.0 |
| Stearic acid | 2.0 |
| Zinc oxide | 5.0 |
| $CaCO_3$ filler | 102.0 |

After press curing the stocks, test specimens were tested for tensile and tear properties by A. S. T. M. procedures. The results were as follows:

*Table III*

| (Percent $C_{16-18}$ Primary Alkyl Amine Acetate Treatment ($CaCO_3$ basis) ("Armeen SD" derivative) | Tensile Strength, p. s. i. | Tear Resistance, p. i. | Optimum Cure Time and Temperature |
|---|---|---|---|
| 0 | 2,700 | 430 | 10 min. at 260° F. |
| 1 | 3,150 | 440 | 3 min. at 260° F. |
| 2 | 3,450 | 525 | 3 min. at 260° F.[1] |
| 4 | 3,500 | 515 | 15 min. at 260° F.[2] |
| 5 | 3,550 | 525 | 10 min. at 242° F.[1] |

[1] The "Altax" and "Thionex" accelerators in compounding formula replaced with 0.5 "Altax" only.
[2] The "Altax" and "Thionex" accelerators replaced with 0.1 "Thionex" only.

From the foregoing results, it will be seen that the treatment of the precipitated calcium carbonate (the latter being in an aqueous slurry or suspension), with 1% of primary alkylamine acetate resulted in an increase in tensile strength of 450 lbs./sq. in. As the amount of alkylamine acetate treatment was increased up to 5%, the tensile strength of the compounded rubber was increased by over 30% as compared to the untreated $CaCO_3$, and the tear resistance was increased over 20%.

It should also be noted from the results in Table III, that an additional effect of the 1% treated calcium carbonate was that the optimum cure time at 260° F. was reduced from ten to three minutes. This indicated that the alkylamine acetate treated-$CaCO_3$ exerted a rubber vulcanization acceleration effect. Hence, in the making of the rubber test with the 2, 4 and 5% alkylamine acetate treated products, the vulcanization control factors, such as the temperature of cure and amount of rubber vulcanization accelerators, were reduced. The results obtained confirm the vulcanization accelerating properties of the alkylamine acetate treating agent.

It was noted that the processing characteristics of the amine-coated pigments were substantially superior to those of the uncoated calcium carbonate control. Whereas the uncoated calcium carbonate formed a hard cake on the back roll of the rubber mill, which cake had to be removed by scraping, the amine-coated product showed only a slight tendency to cake and it was not necessary to scrape the back roll. Visual examination of the stock containing uncoated calcium carbonate revealed the presence of poorly dispersed pigment agglomerates, whereas the amine coated products were well-dispersed and showed no such agglomerates.

The following example was run to illustrate that higher alkylamine additions of less than 1% materially improve the processing characteristics and the rubber reinforcing properties of the amine-coated calcium carbonate pigments.

EXAMPLE 4

Several batches of calcium carbonate were prepared on a laboratory scale following the method described in Example 2 except that the varying percentages of higher amine were added while the precipitation was taking place, rather than to the $CaCl_2$ liquor. The resulting products were incorporated into the following rubber recipe:

| Ingredients: | Parts by weight |
|---|---|
| 1-x smoked sheets | 100.0 |
| 2,2' benzothiazyl disulfide ("Altax") | 1.0 |
| Sulfur | 3.0 |
| Stearic acid | 5.0 |
| Zinc oxide | 5.0 |
| $CaCO_3$ pigment | 100.0 |

The compounded stocks were cured for 20 minutes at 260° F. and the tensile strength and tear resistance were measured. These results appear in Table IV below:

*Table IV*

| Percent N-Primary Alkyl Amine Added to Calcium Carbonate | Tensile Strength, p. s. i. | Tear Resistance, p. i. |
|---|---|---|
| 0 | 2,300 | 333 |
| 0.20 | 2,910 | 515 |
| 0.375 | 2,940 | 580 |
| 0.75 | 3,060 | 513 |
| 1.5 | 2,650 | 395 |

It will be noted that as little as 0.2% amine increased the tensile strength 610 lbs./sq. in. and the tear resistance 185 lbs./in. over the untreated control. As in Example 3, it was noted that the amine-coated pigments were more easily incorporated in the rubber stocks.

EXAMPLE 5

Two samples of a pigment grade calcium carbonate were coated with, respectively, 0.75% of decylamine and dodecylamine. The samples were prepared by reslurrying calcium carbonate filter cake from a commercial plant and adding the amine thereto with vigorous stirring. The products were evaluated in the following rubber recipe:

| Compound ingredient: | Parts by weight |
|---|---|
| GR-S rubber | 100 |
| Cumar resin | 20 |
| Zinc oxide | 5.0 |
| Stearic acid | 1.0 |
| Sulfur | 2.5 |
| N - cyclohexyl - 2 - benzothiazolesulfonamide ("Santocure") | 1.5 |
| Tetramethyl thiuram disulfide ("Methyl Tuads") | 0.15 |
| Pigment | 150.0 |

After press curing the stocks, test specimens were tested from stress-strain and tear properties by A. S. T. M. procedures. The results were as follows:

*Table V*

| Sample | Modulus, p. s. i. | | Tensile Strength, p. s. i. | Tear Resistance, p. i. |
|---|---|---|---|---|
| | 300% | 500% | | |
| Untreated Control | 275 | 900 | 1,880 | 203 |
| Coated with 0.75% Decylamine | 275 | 1,100 | 1,850 | 218 |
| Coated with 0.75% Dodecylamine | 300 | 1,075 | 1,880 | 248 |

The above results demonstrate that higher modulus and tear values are obtained when calcium carbonate is coated with $C_{10}$ and $C_{12}$ primary n-alkylamines. Improved processing characteristics were also noted.

EXAMPLE 6

Several samples of calcium carbonate were coated with dehydroabietylamine following the procedure described in Example 5. The dehydroabietylamine was derived from dehydroabietic acid, which is a dehydrogenated rosin acid which is obtained by disproportionation of natural rosin. The samples were incorporated into the following natural rubber recipe:

| Compound ingredient: | Parts by weight |
|---|---|
| Natural rubber (1-x smoked sheets) | 100 |
| Zinc oxide | 5.0 |
| Stearic acid | 5.0 |
| Sulfur | 3.0 |
| 2,2' benzothiazyl disulfide ("Altax") | 1.0 |
| Pigment | 100 |

The following physical properties were obtained:

Table VI

| Sample | 300% Modulus, p. s. i. | Tensile, p. s. i. | Tear, p. i. |
|---|---|---|---|
| Untreated Control | 600 | 2,390 | 365 |
| Coated with 0.25% Dehydroabietylamine | 675 | 2,260 | 345 |
| Coated with 0.50% Dehydroabietylamine | 725 | 2,380 | 348 |
| Coated with 0.75% Dehydroabietylamine | 750 | 2,500 | 373 |
| Coated with 1.00% Dehydroabietylamine | 750 | 2,340 | 360 |

The improvement in modulus is apparent from the above data, and the coated pigments processed more easily than the uncoated control. Comparable results are obtained when calcium carbonate is coated with hydroabietylamine. These results indicate that rosin amines are equivalent to the 10–18 carbon atom primary n-alkylamines in surface coating calcium carbonate pigments.

The following example discloses the manner in which the alkylamine treated-calcium carbonate product of our invention operates as a vulcanization accelerator in and of itself, and without the presence of any other added rubber accelerator in the compounded rubber.

EXAMPLE 7

The rubber stocks shown in the following table were compounded using uncoated rubber grade $CaCO_3$ and a sample of $CaCO_3$ coated with 4% of the alkylamine acetate described in Example 1. The usual vulcanization accelerators were omitted in Stocks Nos. 1 and 2 to illustrate the acceleration characteristics of the amine-coated calcium carbonate.

Table VII

| Ingredients (Parts by Wt.) | Stock No. 1 | Stock No. 2 |
|---|---|---|
| 1-x Smoked Sheet | 100.0 | 100.0 |
| Stearic Acid | 2.0 | 2.0 |
| Zinc Oxide | 5.0 | 5.0 |
| Sulfur | 3.0 | 3.0 |
| Untreated $CaCO_3$ | 102.0 | |
| $CaCO_3$ Treated with 4% "Armeen SD" Acetate | | 102.0 |
| Tests Results: | | |
| Optimum Cure Time at 260° F. (Min.) | *150 | 60 |
| Tensile Strength (p. s. i.) | 900 | 3,650 |
| Tear Resistance (p. i.) | 121 | 535 |

*Stock could not be removed from the mold at 90 minutes and was removed with difficulty at 150 minutes; still longer time would be required for a satisfactory cure of this stock.

EXAMPLE 8

The reduction in the amount of large agglomerated particles (screened residue) in the precipitated $CaCO_3$ product of our invention is illustrated by this example.

An alkylamine chloride (hydrochloric acid salt of the $C_{16-18}$ n-primary amine described in Example 2) was added to the $CaCl_2$ solution (distiller blow-off liquor) of Example 2, in amounts of 1 and 2% (or 0.84% and 1.68%, anhydrous alkylamine chloride basis, respectively, equivalent to 0.75% and 1.5% of alkylamine) on the basis of chemically equivalent $CaCO_3$. Six percent excess NaOH addition (as explained in Example 2) was employed in a sample to which no alkylamine chloride was added. No caustic soda neutralization treatment was employed in the case of the samples to which the 1 and 2% alkylamine chloride addition was made. The resultant, precipitated $CaCO_3$ samples were then dried and hammer milled.

Ten gram portions of the dry $CaCO_3$ samples were then mixed with 180 ml. of water and 20 ml. of a 1% solution of sodium kerylbenzene sulfonate (40% active agent content) wetting agent. This mixture was stirred for 5 minutes and then washed through a 325 mesh screen for 8 minutes with tap water. The amount remaining on the screen was dried and weighed. The percentage of residual solid product remaining on the screen, on the basis of the original 10 gram amount, thereby indicated the proportion of relatively large size agglomerated particles in the original product. The results of this residue test were as follows:

Table VIII

| Percent of n-Primary Alkyl Amine Chloride ($CaCO_3$ basis, derived from "Armeen T") | Percent 325 Mesh Screen Residue |
|---|---|
| 0 | 26.7 |
| 0.84 | 0.1 |
| 1.68 | 0.4 |

The foregoing results, indicating an extremely low percentage of relatively large size agglomerated particles in the precipitated $CaCO_3$ of our invention, render such product of especial advantage as a paint and printing ink pigment where the presence of oversize particles is likely to produce the defect known in such arts as "graininess."

This application is a continuation-in-part of our co-pending application Serial No. 63,208, filed December 2, 1948, now abandoned.

What is claimed is:

1. An amine-coated, rubber-reinforcing grade, calcium carbonate pigment having dispersed on the surface thereof from about 0.2% to about 5.0% of a higher amine selected from the group consisting of primary n-alkylamines whose alkyl groups contain 10–18 carbon atoms and rosin amines.

2. An amine-coated, rubber-reinforcing grade, calcium carbonate pigment having dispersed on the surface thereof from about 0.2% to about 1.0% of a higher amine selected from the group consisting of primary n-alkylamines whose alkyl groups contain 10–18 carbon atoms and rosin amines.

3. An amine-coated, rubber-reinforming grade, calcium carbonate pigment having dispersed on the surface thereof from about 0.2% to about 5.0% of a primary n-alkylamine whose alkyl groups contain 10–18 carbon atoms.

4. An amine-coated, rubber-reinforcing grade, calcium carbonate pigment having dispersed on the surface thereof from about 0.2% to about 5% of a rosin amine.

5. An amine-coated, rubber-reinforcing grade, calcium carbonate pigment having dispersed on the surface thereof from about 0.2% to about 5.0% of a primary n-alkylamine whose alkyl groups contain 16–18 carbon atoms.

6. An amine-coated, rubber-reinforcing grade, calcium carbonate pigment having dispersed on the surface thereof from about 0.2% to about 5.0% of dehydroabietylamine.

7. A rubber composition comprising a conjugated diolefin elastomer and an amine-coated, rubber-reinforcing grade, calcium carbonate pigment having dispersed on the surface thereof from about 0.2% to about 5.0% of a higher amine selected from the group consisting of primary n-alkylamines whose alkyl groups contain 10–18 carbon atoms and rosin amines.

8. A rubber composition comprising a conjugated diolefin elastomer and an amine-coated, rubber-reinforcing grade, calcium carbonate pigment having dispersed on the surface thereof from about 0.2% to about 1.0% of a higher amine selected from the group consisting of primary n-alkylamines whose alkyl groups contain 10–18 carbon atoms and rosin amines.

9. A rubber composition comprising a conjugated diolefin elastomer and an amine-coated, rubber-reinforcing grade, calcium carbonate pigment having dispersed on the surface thereof from about 0.2% to about 5.0% of a primary n-alkylamine whose alkyl groups contain 10–18 carbon atoms.

10. A rubber composition comprising a conjugated diolefin elastomer and an amine-coated, rubber-reinforcing grade, calcium carbonate pigment having dispersed on the surface thereof from about 0.2% to about 5% of a rosin amine.

11. A rubber composition comprising a conjugated diolefin elastomer and an amine-coated, rubber-reinforcing grade, calcium carbonate pigment having dispersed on the surface thereof from about 0.2% to about 5.0% of a primary n-alkylamine whose alkyl groups contain 16–18 carbon atoms.

12. A rubber composition comprising a conjugated diolefin elastomer and an amine-coated, rubber-reinforcing grade, calcium carbonate pigment having dispersed on the surface thereof from about 0.2% to about 5.0% of dehydroabietylamine.

References Cited in the file of this patent

UNITED STATES PATENTS

| | | |
|---|---|---|
| 2,192,956 | Sloan | Mar. 12, 1940 |
| 2,282,006 | Sloan | May 5, 1942 |
| 2,296,066 | Sloan | Sept. 15, 1942 |
| 2,432,461 | Vesce | Dec. 9, 1947 |
| 2,531,396 | Carter et al. | Nov. 28, 1950 |
| 2,578,605 | Sears | Dec. 11, 1951 |

OTHER REFERENCES

Rubber Age, Dec. 1945, vol. 58, No. 3, pages 331–337.